United States Patent
Sherman et al.

(10) Patent No.: US 10,723,815 B2
(45) Date of Patent: Jul. 28, 2020

(54) BULK POLYMERIZATION OF SILICONE-CONTAINING COPOLYMERS

(71) Applicant: 3M INNOVATIVE PROPERTIES COMPANY, St. Paul, MN (US)

(72) Inventors: Audrey A. Sherman, Woodbury, MN (US); Mark F. Ellis, St. Paul, MN (US); Ramesh C. Kumar, Woodbury, MN (US); Sonja S. Mackey, St. Paul, MN (US); Richard L. Peloquin, Maplewood, MN (US); Jeffrey O. Emslander, Grant, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 0 days.

(21) Appl. No.: 15/879,893

(22) Filed: Jan. 25, 2018

(65) Prior Publication Data

US 2018/0148518 A1    May 31, 2018

Related U.S. Application Data

(62) Division of application No. 13/139,313, filed as application No. PCT/US2009/065519 on Nov. 23, 2009, now abandoned.

(60) Provisional application No. 61/138,211, filed on Dec. 17, 2008.

(51) Int. Cl.
| | |
|---|---|
| *C08F 2/02* | (2006.01) |
| *C08F 220/06* | (2006.01) |
| *C08F 220/18* | (2006.01) |
| *C08F 283/12* | (2006.01) |
| *C08F 290/06* | (2006.01) |
| *C08G 77/442* | (2006.01) |
| *C09J 7/38* | (2018.01) |
| *C08F 230/08* | (2006.01) |
| *C08G 77/20* | (2006.01) |
| *C08L 51/08* | (2006.01) |

(52) U.S. Cl.
CPC .............. *C08F 2/02* (2013.01); *C08F 220/06* (2013.01); *C08F 220/18* (2013.01); *C08F 283/12* (2013.01); *C08F 290/068* (2013.01); *C08G 77/442* (2013.01); *C09J 7/381* (2018.01); *C08F 230/08* (2013.01); *C08G 77/20* (2013.01); *C08L 51/085* (2013.01); *C09J 2451/00* (2013.01)

(58) Field of Classification Search
CPC .... C08F 220/06; C08F 283/12; C08F 230/08; C08F 2/02; C08F 90/068; C08F 220/18; C08G 77/20; C08G 77/442; C09J 7/021; C09J 2451/00
See application file for complete search history.

(56) References Cited

U.S. PATENT DOCUMENTS

| | | | |
|---|---|---|---|
| 3,011,988 A | 12/1961 | Luedke | |
| 3,786,116 A | 1/1974 | Milkovich | |
| 3,842,059 A | 10/1974 | Milkovich | |
| 4,046,795 A | 9/1977 | Martin | |
| 4,238,393 A | 12/1980 | Takamizawa | |
| 4,472,480 A | 9/1984 | Olson | |
| 4,693,935 A * | 9/1987 | Mazurek | C08F 290/068 428/352 |
| 4,736,048 A | 4/1988 | Brown | |
| 4,737,559 A | 4/1988 | Kellen | |
| 4,783,490 A | 11/1988 | Eckberg | |
| 4,906,421 A * | 3/1990 | Plamthottam | C09J 7/20 264/471 |
| 4,980,443 A | 12/1990 | Kendziorski | |
| 5,032,460 A | 7/1991 | Kantner | |
| 5,141,790 A | 8/1992 | Calhoun | |
| 5,154,962 A | 10/1992 | Mertens | |
| 5,202,190 A | 4/1993 | Kantner | |
| 5,296,277 A | 3/1994 | Wilson | |
| 5,362,516 A | 11/1994 | Wilson | |
| 5,407,971 A | 4/1995 | Everaerts | |
| 5,599,602 A | 2/1997 | Leonard | |
| 5,637,646 A * | 6/1997 | Ellis | C08F 2/02 525/309 |
| 5,897,930 A | 4/1999 | Calhoun | |
| 5,986,011 A | 11/1999 | Ellis | |
| 6,197,397 B1 | 3/2001 | Sher | |
| 6,369,123 B1 | 4/2002 | Stark | |

(Continued)

FOREIGN PATENT DOCUMENTS

| | | |
|---|---|---|
| CA | 1233290 | 2/1988 |
| EP | 140941 | 5/1985 |

(Continued)

OTHER PUBLICATIONS

Kawakami, "Synthesis of Silicone Graft Polymers and a Study of Their Surface Active Properties", Makromol. Chem. 185, 9-18 (1984).

(Continued)

*Primary Examiner* — Kelly M Gambetta

(74) *Attorney, Agent, or Firm* — Jeffrey M. Olofson

(57) ABSTRACT

Methods for preparing silicone-containing polymers by essentially adiabatic polymerization methods are disclosed. The polymerization system includes free radically polymerizable monomers. The monomers include ethylenically unsaturated silicone-containing monomers and/or mercapto-functional silicones as well as additional free radically polymerizable monomers. The silicone-containing polymers are useful as adhesives or release materials.

11 Claims, No Drawings

(56) References Cited

U.S. PATENT DOCUMENTS

| | | |
|---|---|---|
| 2002/0029855 A1* | 3/2002 | Vasilakes .............. B65B 51/067 |
| | | 156/387 |
| 2002/0057300 A1 | 5/2002 | Baker |
| 2003/0008162 A1* | 1/2003 | Oya ....................... C08K 5/353 |
| | | 428/480 |
| 2005/0095370 A1 | 5/2005 | Ellis |
| 2007/0213463 A1* | 9/2007 | Sherman ............... C08F 265/04 |
| | | 525/100 |

FOREIGN PATENT DOCUMENTS

| | | |
|---|---|---|
| EP | 0421588 | 4/1991 |
| JP | 03-091509 | 4/1991 |
| JP | 2004-202308 | 7/2004 |
| KR | 10-1999-0072192 | 9/1999 |
| KR | 10-2006-0123222 | 12/2006 |
| WO | WO 1984-03837 | 10/1984 |
| WO | WO 01/85865 | 11/2001 |

OTHER PUBLICATIONS

McGraw-Hill, "Modern Plastics Encyclopedia", Oct. 1968 vol. 45.
McGraw-Hill, "Modern Plastics Encyclopedia", Oct. 1969 vol. 46.
Nakanishi, "Improvement of the Conductivity of Polydiacethylenes by Chemical and Physical Methods", ACS Polymer Preprints 25 (1), 244-245, (1984).
Kawakami, "Silicone Macromers for Graft Polymer Synthesis", Polymer J. 14, 913-917, (1982).
International Search Report for PCT/US2009/065519, 3 pages.

* cited by examiner

BULK POLYMERIZATION OF SILICONE-CONTAINING COPOLYMERS

FIELD OF THE DISCLOSURE

This disclosure relates to bulk polymerization methods to form silicone-containing polymers, silicone-containing polymers and articles prepared from silicone-containing polymers.

BACKGROUND

Silicone-containing copolymers are a class of polymeric materials that have found a wide variety of uses, including uses such as coatings (including release coatings), adhesives (including pressure sensitive adhesives), gaskets, tubing, vibration dampening materials and the like.

Many of these silicone-containing copolymers are polydiorganosiloxane-based copolymers. The unique properties of these copolymers are derived mainly from the physical and chemical characteristics of the siloxane bond and the organic substituents.

Typically the outstanding properties of polydiorganosiloxane copolymers include resistance to ultraviolet light, extremely low glass transition temperature, good thermal and oxidative stability, high permeability to many gases, very low surface energy, low index of refraction, good hydrophobicity and good dielectric properties.

Traditionally silicone-containing copolymers have been prepared in solution. The dissolved copolymer is then cast or coated and dried. The solvents aid in the polymerization by solubilizing the reactants and also serve to dissipate the heat generated during exothermic reactions.

For a number of reasons, it may be desirable to form polymers without utilizing solvents or where the use of solvent is minimized. Environmental concerns, such as the release of solvents into the atmosphere and the need to recycle and/or dispose of the solvents after use, are prompting efforts to reduce or eliminate solvent use. Shipment of polymers dissolved in solvent can be difficult and expensive. Also, many common solvents are flammable requiring handling of polymer solutions with added safety precautions.

SUMMARY

Disclosed are methods for preparing silicone-containing polymers under essentially adiabatic polymerization conditions. Such polymerizations can be carried out without the use of solvent or with a minimum of solvent and produce polymers which are useful in a variety of applications, including as adhesives and release materials.

In one embodiment, a method is disclosed comprising the steps of providing a first reaction mixture, deoxygenating the first reaction mixture, heating the first reaction mixture, allowing the first reaction mixture to polymerize under essentially adiabatic conditions to yield an at least partially polymerized mixture, cooling the at least partially polymerized mixture, forming a second reaction mixture by adding additional components to the at least partially polymerized mixture, deoxygenating the second reaction mixture, heating the second reaction mixture, and allowing the second reaction mixture to polymerize under essentially adiabatic conditions to form a polymer. The first reaction mixture may comprise an ethylenically unsaturated silicone-containing monomer, at least one additional ethylenically unsaturated monomer, a chain transfer agent, and a thermal initiator. The thermal initiator may comprise a single thermal initiator or may comprise a combination of different thermal initiators. The second reaction mixture may comprise, in addition to the partially polymerized first reaction mixture, an additional thermal initiator, a chain transfer agent, and optionally a solvent. The heating steps typically comprise heating of the reaction mixtures to a temperature above the activation temperature of a thermal initiator present in the reaction mixture In some embodiments, the ethylenically unsaturated silicone-containing monomer comprises a silicone macromer with the structure W-(A)$_n$-Si(R$^7$)$_{3-m}$Q$_m$, wherein W is a vinyl group, A is a divalent linking group, n is zero or 1, m is an integer of from 1 to 3, R$^7$ is hydrogen, alkyl, aryl, or alkoxy; and Q is a monovalent siloxane polymeric moiety having a number average molecular weight above about 500 and is essentially unreactive under copolymerization conditions.

In other embodiments, a method is disclosed comprising the steps of providing a first reaction mixture, deoxygenating the first reaction mixture, heating the first reaction mixture, allowing the first reaction mixture to polymerize under essentially adiabatic conditions to yield an at least partially polymerized mixture, cooling the at least partially polymerized mixture, forming a second reaction mixture by adding additional components to the at least partially polymerized mixture, deoxygenating the second reaction mixture, heating the second reaction mixture, and allowing the second reaction mixture to polymerize under essentially adiabatic conditions to form a polymer. The first reaction mixture may comprise a mercapto-functional silicone, at least one ethylenically unsaturated monomer, and a thermal initiator. The thermal initiator may comprise a single thermal initiator or may comprise a combination of different thermal initiators. The second reaction mixture may comprise, in addition to the partially polymerized first reaction mixture, an additional thermal initiator, and optionally a solvent. The heating steps typically comprise heating of the reaction mixtures to a temperature above the activation temperature of a thermal initiator present in the reaction mixture.

In some embodiments, the mercapto-functional silicone has the structure (R$^1$)$_{3-x}$(HSR$^2$)$_x$Si—(OSiR$^5$R$^6$)$_y$—Si(R$^3$)$_{3-q}$(R$^4$SH)$_q$ wherein each R$^1$ is independently an alkyl, aryl, alkaryl, alkoxy, alkylamino, hydroxyl, hydrogen, or fluoroalkyl group, each R$^2$ is a divalent linking group, each R$^3$ is an alkyl, aryl, alkaryl, alkoxy, alkylamino, hydroxyl, hydrogen, or fluoroalkyl group, each R$^4$ is a divalent linking group, each R$^5$ is an alkyl, aryl, alkaryl, alkoxy, alkylamino, hydroxyl, fluoroalkyl, hydrogen, or —ZSH, wherein Z is a divalent linking group, each R$^6$ is an alkyl, aryl, alkaryl, alkoxy, alkylamino, hydroxyl, fluoroalkyl, hydrogen, or —ZSH, wherein Z is a divalent linking group, x is an integer of 0-3, y is an integer of 10 or greater, and q is an integer of 0-3.

DETAILED DESCRIPTION

Typically, reactions to prepare silicone-containing copolymers, particularly silicone-containing copolymers which are derived from free radically polymerizable starting materials, such as ethylenically unsaturated silicone-containing materials and mercapto-functional silicones, are run in a solvent. One reason for this is that the compatibility of silicone-containing starting materials with other reactive materials in the reaction mixture is generally low. This low compatibility leads to non-homogenous mixtures and incomplete polymerization reactions. The use of solvents helps to overcome this difficulty, especially in bulk reactions.

The use of adiabatic polymerization techniques have been used to prepare copolymers from ethylenically unsaturated starting materials. However, it was unclear whether this technique could be used with silicone-containing starting materials due to the incompatibility of silicone-containing materials with other reactive materials in the reaction mixture. This disclosure provides bulk polymerization methods for preparing silicone-containing polymers.

The polymerization techniques of this disclosure provide for the preparation of a wide range of silicone-containing polymers. Dependent upon the composition of the reaction mixture used to form the silicone-containing polymers, the polymers may be for example, adhesives, such as pressure sensitive adhesives or release materials. The reaction mixture comprises a free radically polymerizable silicone-containing moiety, a free radically polymerizable co-monomer, a chain transfer agent, and a thermal initiator. In some embodiments the free radically polymerizable silicone-containing moiety may be an ethylenically unsaturated silicone-containing monomer, in other embodiments the free radically polymerizable silicone-containing moiety may be a mercapto-functional silicone. In still other embodiments the reactive mixture may contain a mixture of ethylenically unsaturated silicone-containing monomer and mercapto-functional silicone.

The reaction mixture also contains an additional free radically polymerizable monomer or monomers. The nature of the additional monomer also determines the properties of the formed silicone-containing polymer.

As used herein "polymer" refers to macromolecular materials having at least five repeating monomeric units, which may or may not be the same. The term polymer, as used herein, encompasses homopolymers and copolymers.

As used herein "free radically polymerizable" refers to materials which polymerize upon exposure to a free radical. Ethylenically unsaturated groups and mercapto groups are examples of free radically polymerizable groups.

As used herein "ethylenically unsaturated" refers to materials which contain at least one terminal carbon-carbon double bond ($CH_2$=CR—), where R is H or an alkyl group. Vinyl groups, allyl groups, acrylate groups, and methacrylate groups are examples of ethylenically unsaturated groups.

As used herein "silicone-containing" refers to materials and polymers which contain siloxane linkages. The terms "silicone" and "siloxane" are used interchangeably and refer to materials or polymers which contain the repeat unit (—O—$SiR_2$—) where each R is independently an alkyl or aryl group.

As used herein the term "silicone macromers" refers to silicone-containing macromers. Macromers are macromolecular monomers.

As use herein the term "mercapto-functional silicones" refers to silicone-containing moieties that contain at least one mercapto group (—SH). The mercapto group is the sulfur analog to the hydroxyl group (—OH) and is sometime also referred to as a thiol group. The mercapto group is a free radically polymerizable group.

The term "alkenyl" refers to a monovalent group that is a radical of an alkene, which is a hydrocarbon with at least one carbon-carbon double bond. The alkenyl can be linear, branched, cyclic, or combinations thereof and typically contains 2 to 20 carbon atoms. In some embodiments, the alkenyl contains 2 to 18, 2 to 12, 2 to 10, 4 to 10, 4 to 8, 2 to 8, 2 to 6, or 2 to 4 carbon atoms. Exemplary alkenyl groups include ethenyl, n-propenyl, and n-butenyl.

The term "alkyl" refers to a monovalent group that is a radical of an alkane, which is a saturated hydrocarbon. The alkyl can be linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl groups include, but are not limited to, methyl, ethyl, n-propyl, isopropyl, n-butyl, isobutyl, tert-butyl, n-pentyl, n-hexyl, cyclohexyl, n-heptyl, n-octyl, and ethylhexyl.

The term "alkaryl" refers to an monvalent group which is an alkyl group substituted with at least one aryl group, of the general formula —R—Ar. A benzyl group (—$CH_2$-Ph) is an example of an alkaryl group.

The term "halo" refers to fluoro, chloro, bromo, or iodo.

The term "haloalkyl" refers to an alkyl having at least one hydrogen atom replaced with a halo. Some haloalkyl groups are fluoroalkyl groups, chloroalkyl groups, and bromoalkyl groups. The term "perfluoroalkyl" refers to an alkyl group in which all hydrogen atoms are replaced by fluorine atoms.

The term "aryl" refers to a monovalent group that is aromatic and carbocyclic. The aryl can have one to five rings that are connected to or fused to the aromatic ring. The other ring structures can be aromatic, non-aromatic, or combinations thereof. Examples of aryl groups include, but are not limited to, phenyl, biphenyl, terphenyl, anthryl, naphthyl, acenaphthyl, anthraquinonyl, phenanthryl, anthracenyl, pyrenyl, perylenyl, and fluorenyl.

The term "alkylene" refers to a divalent group that is a radical of an alkane. The alkylene can be straight-chained, branched, cyclic, or combinations thereof. The alkylene often has 1 to 20 carbon atoms. In some embodiments, the alkylene contains 1 to 18, 1 to 12, 1 to 10, 1 to 8, 1 to 6, or 1 to 4 carbon atoms. The radical centers of the alkylene can be on the same carbon atom (i.e., an alkylidene) or on different carbon atoms.

The term "heteroalkylene" refers to a divalent group that includes at least two alkylene groups connected by a thio, oxy, or —NR— where R is alkyl. The heteroalkylene can be linear, branched, cyclic, substituted with alkyl groups, or combinations thereof. Some heteroalkylenes are poloxyyalkylenes where the heteroatom is oxygen such as for example, —$CH_2CH_2(OCH_2CH_2)_nOCH_2CH_2$—.

The term "arylene" refers to a divalent group that is carbocyclic and aromatic. The group has one to five rings that are connected, fused, or combinations thereof. The other rings can be aromatic, non-aromatic, or combinations thereof. In some embodiments, the arylene group has up to 5 rings, up to 4 rings, up to 3 rings, up to 2 rings, or one aromatic ring. For example, the arylene group can be phenylene.

The term "heteroarylene" refers to a divalent group that is carbocyclic and aromatic and contains heteroatoms such as sulfur, oxygen, nitrogen or halogens such as fluorine, chlorine, bromine or iodine.

The term "aralkylene" refers to a divalent group of formula —$R^a$—$Ar^a$— where $R^a$ is an alkylene and $Ar^a$ is an arylene (i.e., an alkylene is bonded to an arylene).

The term "alkoxy" refers to a monovalent group of formula —OR where R is an alkyl group.

The term "alkylamino" refers to a monovalent group of formula —$R^a$—$NR^b$—$R^c$ where $R^a$ is an alkylene and $R^b$ and $R^c$ are each independently hydrogen, an alkyl, or an aryl group.

The term "adhesive" as used herein refers to polymeric compositions useful to adhere together two adherends. An example of an adhesive is a pressure sensitive adhesive.

Pressure sensitive adhesives are well known to one of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as pressure sensitive adhesives include polymers designed and formulated to exhibit the requisite viscoelastic properties resulting in a desired balance of tack, peel adhesion, and shear holding power.

The term "release materials" as used herein refers to polymeric materials which may be coated onto a substrate to form a release surface. A release surface is defined as one that possesses a lack of adhesion, which provides an easy release from substrates, particularly adhesive coated substrates. Examples of release surfaces include release liners and low adhesion backsizes (LABs). LABs are typically used on adhesive articles, such as tapes, where an adhesive coating is applied to one side of a backing and a release material is applied to the opposite side. Thus when the tape is rolled up, the adhesive contacts the LAB permitting the tape to be unrolled again when used.

The terms "weight %", "wt %" and "% by weight" are used interchangeably and refer to the weight of component relative to a total composition weight. Therefore, if a component has a weight % of 30, that indicates there are 30 parts by weight of the component to a total composition weight of 100 parts by weight.

Acrylate and methacrylate monomers are referred to collectively herein as "(meth)acrylate" monomers. (Meth) acrylate polymers may be copolymers, optionally in combination with other, non-(meth)acrylate, e.g., vinyl-unsaturated, monomers.

As defined herein, by "essentially adiabatic" it is meant that the total of the absolute value of any energy exchanged to or from the batch during the course of reaction will be less than about 15% of the total energy liberated due to reaction for the corresponding amount of polymerization that has occurred during the time that polymerization has occurred. Essentially adiabatic reactions are exemplified in, for example, U.S. Pat. No. 5,986,011 (Ellis).

In the methods of this disclosure, free radically polymerizable reaction mixtures are subjected to essentially adiabatic polymerization conditions. Although one essentially adiabatic reaction may be employed, generally two or more essentially adiabatic reaction cycles are generally employed if essentially complete conversion of monomer to polymer is desired. There typically is cooling between the reaction cycles. Cooling of the reaction mixture between reaction cycles typically is performed to prevent the temperature of the reaction mixture from increasing to a point where the product is unstable. This instability can be manifest by polymer discoloration, polymer oxidation, depolymerization to produce undesirable low molecular weight oligomers, etc. The temperature necessary to avoid instability depends in part on the monomers being used. To avoid such instability the temperature of the reaction mixture is generally kept below about 300° C., or even below about 250° C. The reaction conditions are also typically chosen so that at the end of the final reaction cycle, the product viscosity is such that draining from the reaction vessel can be performed (Brookfield viscosity at draining temperature less than about 500,000 centipoise).

Optionally, a series of one or more essentially adiabatic reaction cycles can be used to provide a syrup of polymer dissolved in monomer, typically in the range of about 40-95 weight % based on total weight of monomer(s) and polymer where the unreacted monomer can be optionally stripped from the polymer to provide the final polymer product rather than running the reaction to completion.

The method of the present disclosure uses one or more thermal free radical initiators that under the increasing reaction temperature profile from essentially adiabatic reaction conditions, provide free radicals at a rate such that narrow polymer molecular weight distribution is obtained. The amount of free radicals generated during the increasing temperature profile is controlled by the amounts of each initiator used and the temperature decomposition characteristics of the selected initiators. This process is capable of achieving polymer molecular weight distributions essentially the same as or narrower than isothermal solution polymerization methods.

As has been discussed previously, for example in U.S. Pat. No. 5,986,011 (Ellis), when appropriately polymerized, essentially adiabatic bulk free-radical runaway polymerization in a batch reactor can present several advantages:

1) When adiabatically polymerized, because the reaction equipment is not being used to cool the reacting mixture, there is not a significant temperature gradient at the walls of the reaction equipment. Such a temperature gradient can detrimentally broaden the molecular weight distribution of the polymer by making high molecular weight product in the cold boundary layer near the reactor wall, because of the free-radical reaction kinetics well known to those skilled in the art. For example, such high molecular weight components can degrade the coating performance of a hot-melt coated adhesive or release material.

2) The reaction equipment utilized according to the method of the present disclosure is simple.

3) Because heat transfer requirements during reaction are eliminated, the method of the present disclosure more readily scales up from lab-scale equipment to large production-scale equipment than temperature-controlled polymerization methods that rely on available heat transfer area to control reaction temperature.

4) Continuous polymerization reaction equipment contains various degrees of "backmixing" where there is a residence time distribution of the reacting material in the reaction equipment. Some of the reacting material can remain in the reaction equipment for extended periods of time to degrade product performance by continued attack by the free-radical initiator to form cross-linked polymer. Crosslinked gel particles can degrade product performance, such as the coating smoothness of a hot-melt coated adhesive or release material.

5) Depending upon the polymer and reaction conditions, essentially complete conversion of monomer to polymer is possible according to the method of the present disclosure. Based on specific product requirements, it may be necessary to react the final 1-15 weight % of monomer slowly (over a period of one to several hours) to minimize the formation of low molecular weight components as monomer depletes. Residence times of hours in continuous reaction equipment, such as an extruder, can be economically impractical.

A batch reactor is used in the method of the present disclosure. By reacting batch wise is meant that the polymerization reaction occurs in a vessel where product is drained at the end of the reaction, not continuously while reacting. The raw materials can be charged to the vessel at one time prior to reacting, in steps over time while reacting, or continuously over a time period while reacting, and the reaction is allowed to proceed for the necessary amount of time to achieve, in this case, polymer properties including the desired polymerization amount, molecular weight, etc. If necessary, additives can be mixed into the batch prior to draining. When the processing is complete, the product is drained from the reaction vessel.

A typical batch reactor for this disclosure will comprise a pressure vessel constructed of material suitable for the polymerization, such as stainless steel which is commonly used for many types of free-radical polymerization. Typically, the pressure vessel will have ports for charging raw materials, removing product, emergency pressure relief, pressurizing the reactor with inert gas, pulling vacuum on the reactor head space, etc. Typically, the vessel is enclosed partially in a jacket through which a heat transfer fluid (such as water) is passed for heating and cooling the contents of the vessel. Typically, the vessel contains a stirring mechanism such as a motor-driven shaft inserted into the vessel to which stirring blades are attached. Commercial batch reaction equipment typically is sized in the range of about 10 to about 20,000 gallons (37.9 to 75,708 liters), and can be custom-built by the user or can be purchased from vendors such as Pfaudler-U.S., Inc. of Rochester, N.Y.

Caution should be exercised to ensure that the reaction vessel can contain the elevated vapor pressure of the reaction mixture, at the temperatures that will be encountered, particularly if the reaction should proceed faster or further than desired because of an accidental overcharge/mischarge of initiator(s). It is also very important to ensure the reaction mixture will not decompose at the temperatures encountered to form gaseous products that could dangerously elevate the vessel pressure. Small-scale adiabatic calorimetric experiments, which one skilled in the art would be readily capable of performing, can be used to determine the runaway characteristics for particular monomers and initiator mixtures. For example, the Reactive System Screening Tool (RSST) or the Vent Sizing Package (VSP), both available from Fauske and Associates, Inc. of Burr Ridge, Ill., are devices capable of investigating runaway reaction characteristics and severity.

The essentially adiabatic polymerization reaction is carried out with a reaction mixture comprising a free radically polymerizable silicone-containing moiety, a free radically polymerizable co-monomer, a chain transfer agent, and a thermal initiator. The free radically polymerizable silicone-containing moiety may be an ethylenically unsaturated silicone-containing monomer, a mecapto-functional silicone, or a combination thereof. One thermal initiator may be used or a combination of different thermal initiators may be used.

A wide variety of ethylenically unsaturated silicone-containing monomers may be used. For example, a number of vinyl-functional silicones are commercially available. Particularly suitable are silicone-containing macromers, especially ones with the general formula of Formula 1:

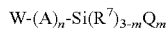  Formula 1 where W is a vinyl group, A is a divalent linking group, n is zero or 1, m is an integer of from 1 to 3; $R^7$ is hydrogen, lower alkyl (e.g., methyl, ethyl, or propyl), aryl (e.g., phenyl or substituted phenyl), or alkoxy, and Q is a monovalent siloxane polymeric moiety having a number average molecular weight above about 500 and is essentially unreactive under copolymerization conditions.

Such macromers are known and may be prepared by the method disclosed by Milkovich et al., as described in U.S. Pat. Nos. 3,786,116 and 3,842,059. The preparation of polydimethylsiloxane macromer and subsequent copolymerization with vinyl monomers have been described in several papers by Y. Yamashita et al., Polymer J. 14, 913 (1982); ACS Polymer Preprints 25 (1), 245 (1984); Makromol. Chem. 185, 9 (1984) and in U.S. Pat. No. 4,693,935 (Mazurek). This method of macromer preparation involves the anionic polymerization of hexamethylcyclotrisiloxane monomer to form living polymer of controlled molecular weight, and termination is achieved via chlorosilane compounds containing a polymerizable vinyl group.

Suitable monomers for use in the above-mentioned anionic polymerization are, in general, diorganocyclosiloxanes of the formula $(-Si(R^7)_2-O-)_r$ where each $R^7$ is as previously defined and r is an integer of 3 to 7. Examples of useful cyclic siloxanes include, $D_3$ where r is equal to 3 and each $R^7$ is methyl and $D_4$ where r is equal to 4 and each $R^7$ is methyl. The cyclic siloxanes being hereafter designated $D_3$ and $D_4$, respectively. $D_3$, which is a strained ring structure, is especially useful.

Initiators of the anionic polymerization are chosen such that monofunctional living polymer is produced. Suitable initiators include alkali metal hydrocarbons such as alkyl or aryl lithium, sodium, or potassium compounds containing up to 20 carbon atoms in the alkyl or aryl radical or in some instances up to 8 carbon atoms. Examples of such compounds are ethylsodium, propylsodium, phenylsodium, butylpotassium, octylpotassium, methyllithium, ethyllithium, n-butyllithium, sec-butyllithium, tert-butyllithium, phenyllithium, and 2-ethylhexyllithium. Lithium compounds are preferred as initiators. Also suitable as initiators are alkali metal alkoxides, hydroxides, and amides, as well as triorganosilanolates of the formula $R^8Si(R^7)_2-O-M$ where M is alkali metal, tetraalkylammonium, or tetraalkylphosphonium cation and where each $R^7$, is as previously defined and $R^8$ is an alkyl, alkoxy, alkylamino, aryl, hydroxyl or fluoroalkyl. The triorganosilanolate initiator lithium trimethylsilanolate (LTMS) is particularly useful. In general, the use of both strained cyclic monomer and lithium initiator reduces the likelihood of redistribution reactions and thereby provides siloxane macromonomer of narrow molecular weight distribution which is reasonably free of unwanted cyclic oligomers.

Molecular weight is determined by the initiator/cyclic monomer ratio, and thus the amount of initiator may vary from about 0.004 to about 0.4 mole of organometallic initiator per mole of monomer. Typically, the amount will be from about 0.008 to about 0.04 mole of initiator per mole of monomer.

For the initiation of the anionic polymerization, an inert, generally polar organic solvent can be utilized. Anionic polymerization propagation with lithium counterion typically uses either a strong polar solvent such as tetrahydrofuran, dimethyl sulfoxide, or hexamethylphosphorous triamide, or a mixture of such polar solvent with nonpolar aliphatic, cycloaliphatic, or aromatic hydrocarbon solvent such as hexane, heptane, octane, cyclohexane, or toluene. The polar solvent serves to "activate" the silanolate ion, making propagation possible.

Generally, the polymerization can be carried out at a temperature ranging from about
−50° C. to about 100° C., or from about −20° C. to about 30° C. Anhydrous conditions and an inert atmosphere such as nitrogen, helium, or argon are usually used.

Termination of the anionic polymerization is, in general, achieved via direct reaction of the living polymeric anion with halogen-containing termination agents, i.e., functionalized chlorosilanes, to produce vinyl-terminated polymeric monomers. Such terminating agents may be represented by the general formula $W(A)_nSi(R^7)_{3-m}Cl_m$ where Cl is a chlorine atom and where W, A, n, m, and $R^7$ have been previously defined. A preferred terminating agent is methacryloxypropyldimethylchlorosilane. The termination reaction is carried out by adding a slight molar excess of the terminating agent (relative to the amount of initiator) to the living polymer at the polymerization temperature. According to the aforementioned papers by Y. Yamashita et al., the reaction mixture may be ultrasonically irradiated after addition of the terminating agent in order to enhance functionality of the macromer. Purification of the macromer can be effected by addition of methanol.

Polymers prepared from these silicone macromers may have a wide variety or uses. Depending upon the co-monomers used, these polymers may be adhesives, such as pressure sensitive adhesives or they may be release materials. Typically the silicone macromer is incorporated into the copolymer in the amount of about 0.01 to about 50% of the total monomer weight to obtain the desired properties. In some embodiments the amount of silicone macromer is 1-10 weight %, 1-5 weight % or even 3-5 weight %.

In some embodiments the free radically polymerizable moiety may be a mercapto-functional silicone. Examples of suitable mercapto-functional silicones are described, for example in U.S. Pat. No. 5,032,460 (Kantner et al.). Such mercapto-functional silicones can be represented by the general formula of Formula 2:

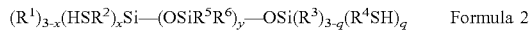
$$(R^1)_{3-x}(HSR^2)_xSi\text{—}(OSiR^5R^6)_y\text{—}OSi(R^3)_{3-q}(R^4SH)_q \qquad \text{Formula 2}$$

wherein each $R^1$ is a monovalent moiety which can independently be the same or different and is selected from the group consisting of alkyl, aryl, alkaryl, alkoxy, alkylamino, hydroxyl, hydrogen, and fluoroalkyl;

each $R^2$ can independently be the same or different and is a divalent linking group;

each $R^3$ is a monovalent moiety which can independently be the same or different and is selected from the group consisting of alkyl, aryl, alkaryl, alkoxy, alkylamino, hydroxyl, hydrogen, and fluoroalkyl;

each $R^4$ can independently be the same or different and is a divalent linking group;

each $R^5$ is a monovalent moiety which can independently be the same or different and is selected from the group consisting of alkyl, aryl, alkaryl, alkoxy, alkylamino, hydroxyl, fluoroalkyl, hydrogen, and —ZSH, wherein Z is a divalent linking group;

$R^6$ is a monovalent moiety which can independently be the same or different and is selected from the group consisting of alkyl, aryl, alkaryl, alkoxy, alkylamino, hydroxyl, fluoroalkyl, hydrogen, and —ZSH, wherein Z is a divalent linking group;

x is an integer of 0-3;
y is an integer of 10 or greater;
q is an integer of 0-3;
$R^5$ comprises 0-y -ZSH moieties;
$R^6$ comprises 0-y -ZSH moieties;
wherein at least one of the following is true: q is an integer of at least 1; x is an integer of at least 1; $R_5$ comprises at least one —ZSH moiety; and $R_6$ comprises at least one —ZSH moiety.

In some embodiments, $R^1$ comprises either a $C_1$-$C_4$ alkyl group or an hydroxyl group. These groups are typically chosen for reasons of commercially availability. Especially useful are embodiments where $R^1$ is a methyl or butyl group.

Typically, the divalent linking group $R^2$ comprises a $C_1$ to $C_{10}$ alkylene, arylene, alkarylene and alkoxyalkylene group. In some embodiments, $R^2$ is either a $C_1$-$C_3$ alkylene or a $C_7$-$C_{10}$ alkarylene due to ease of synthesis of these compounds. For reasons of availability, especially useful are embodiments where $R^2$ is a —CH$_2$—; a —CH$_2$CH$_2$CH$_2$—; or a —CH$_2$—(C$_6$H$_4$)—CH$_2$CH$_2$— group.

In some embodiments, $R^3$ comprises a either a $C_1$-$C_4$ alkyl group or an hydroxyl group. These groups are typically chosen for reasons of commercially availability. Especially useful are embodiments where $R^3$ is a methyl or butyl group.

Typically, the divalent linking group $R^4$ comprises a $C_1$ to $C_{10}$ alkylene, arylene, alkarylene and alkoxyalkylene group. In some embodiments, $R^4$ is either a $C_1$-$C_3$ alkylene or a $C_7$-$C_{10}$ alkarylene due to ease of synthesis of these compounds. For reasons of availability, especially useful are embodiments where $R^4$ is a —CH$_2$—; a —CH$_2$CH$_2$CH$_2$—; or a —CH$_2$—(C$_6$H$_4$)—CH$_2$CH$_2$— group.

Typically, the groups $R^5$ and $R^6$ independently comprise alkyl, aryl, alkaryl, alkoxy, alkylamino, hydroxyl, fluoroalkyl, hydrogen, or —ZSH groups, wherein Z is a divalent linking group. Useful divalent linking groups Z include, for example, $C_1$ to $C_{10}$ alkylene, alkarylene, arylene, and alkoxyalkylene groups. Generally, for reasons of commercial availability, Z is a —CH$_2$— or a —CH$_2$CH$_2$CH$_2$— group. In embodiments where $R^5$ or $R^6$ does not comprise a —ZSH group, they typically comprise a $C_1$ to $C_3$ alkyl, a fluoroalkyl, or a phenyl group. Generally, when $R^5$ or $R^6$ does not comprise a —ZSH group, they are methyl groups.

Typically, y is an integer ranging from about 40 to about 270 in order to provide the silicone segment with a molecular weight ranging from about 3,000 to about 20,000 in order to provide suitable release performance. In some embodiments, y is an integer ranging from about 67 to about 270 in order to provide the silicone segment with a molecular weight ranging from about 5,000 to about 20,000. In some embodiments the number average molecular weight of the mercapto-functional silicone is in the range from 2,000-20,000 grams/mole or from 5,000-10,000 grams/mole.

The number of mercapto-functional groups on the mercapto-functional silicone compound can vary. The ratio of the weight of mercapto-functional groups to the total weight of the mercapto-functional silicone compound can range from about 0.5:99.5 to about 15:85. Typically, the weight ratio of mercapto-functional groups to mercapto-functional silicone compound ranges from about 2:98 to about 10:90. In some embodiments the mole % of —CH$_2$CH$_2$CH$_2$SH groups in the mercapto-functional silicone ranges from 1-20 mole % or from 2-4 mole %.

Useful mercapto-functional silicone compounds can be prepared by any known method including, for example, those presented in U.S. Pat. Nos. 4,238,393; 4,046,795; 4,783,490 and Canadian Patent No. 1,233,290. A particularly useful mercapto-functional silicone is commercially available from ShinEtsu Silicones, Akron, Ohio as "KF-2001".

Typically, the amount of mercapto-functional silicone present in the reactive mixture is in the range of 1-40 weight %, 5-35 weight %, or even 10-30 weight %.

The free radically polymerizable reaction mixtures of this disclosure also comprise a free radically polymerizable co-monomer. A wide variety of free radically polymerizable co-monomers or mixtures of co-monomers may be used. Examples of suitable monomers include vinyl monomers, (meth)acrylate monomers and polar copolymerizable monomers.

Typically, the polymers formed by the method of this disclosure contain at least 50% by weight of co-monomers relative to the total monomer content. In some instances the polymers contain 60%, 70%, 80% or even 90% or more by weight of co-monomers relative to the total monomer content.

The co-monomers used affect the final properties of the formed polymer, so the proposed use for the polymer will influence the monomer selection. For example, Tg is one polymer parameter that may be important in the formed polymer. Typically, when the polymer is to be used as an adhesive, especially a pressure sensitive adhesive, the co-monomers are generally chosen such that the formed polymer has a Tg of less than 20° C. or even less than 0° C. On the other hand, when the polymer is to be used as a release material, the co-monomers are generally chosen such that the formed polymer has a Tg of greater than 20° C. or even greater than 30° C.

The substitution and functionality of the co-monomers are also a factor in determining which co-monomers are used. For example, in some embodiments it may be desirable to form a pressure sensitive adhesive polymer which is free of acidic groups. In this instance when it is desirable to have polar copolymerizable monomers present in the polymer, acid functional monomers are generally avoided and basic functional monomers are used instead.

Examples of suitable vinyl monomers include, for example, vinyl esters (e.g., vinyl acetate), styrene, substituted styrenes (e.g., alpha-methyl styrene), vinyl halides, vinyl propionates, and mixtures thereof. Other useful vinyl monomers include macromeric (meth)acrylates such as (meth)acrylate-terminated styrene oligomers and (meth)acrylate-terminated polyethers, such as are described in PCT Patent Application WO 84/03837 and European Patent Application EP 140941.

(Meth)acrylate monomers are (meth)acrylate esters of non-tertiary alkyl alcohols, the alkyl groups of which comprise from about 1 to about 20, or about 1 to about 18 carbon atoms, such as those of Formula 3:

$$H_2C=CR^9-C(O)-OR^{10} \qquad \text{Formula 3}$$

wherein $R^9$ is H or $CH_3$, the latter corresponding to where the (meth)acrylate monomer is a methacrylate monomer, and $R^{10}$ is a linear, branched, aromatic, or cyclic hydrocarbon group, and —C(O)— represents a carbonyl group. When $R^{10}$ is a hydrocarbon group, it can also include heteroatoms (e.g., oxygen or sulfur).

Examples of suitable (meth)acrylate monomers useful in the present disclosure include, but are not limited to, benzyl methacrylate, n-butyl acrylate, n-butyl methacrylate, cyclohexyl acrylate, cyclohexyl methacrylate, decyl acrylate, 2-ethoxy ethyl acrylate, 2-ethoxy ethyl methacrylate, ethyl acrylate, 2-ethylhexyl acrylate, ethyl methacrylate, n-hexadecyl acrylate, n-hexadecyl methacrylate, hexyl acrylate, hydroxy-ethyl methacrylate, hydroxy ethyl acrylate, isoamyl acrylate, isobornyl acrylate, isobornyl methacrylate, isobutyl acrylate, isodecyl acrylate, isodecyl methacrylate, isononyl acrylate, isooctyl acrylate, isooctyl methacrylate, isotridecyl acrylate, lauryl acrylate, lauryl methacrylate, 2-methoxy ethyl acrylate, methyl acrylate, methyl methacrylate, 2-methyl butyl acrylate, 4-methyl-2-pentyl acrylate, 1-methylcyclohexyl methacrylate, 2-methylcyclohexyl methacrylate, 3-methylcyclohexyl methacrylate, 4-methylcyclohexyl methacrylate, octadecyl acrylate, octadecyl methacrylate, n-octyl acrylate, n-octyl methacrylate, 2-phenoxy ethyl methacrylate, 2-phenoxy ethyl acrylate, propyl acrylate, propyl methacrylate, n-tetradecyl acrylate, n-tetradecyl methacrylate, and mixtures thereof.

In some embodiments, particularly release materials, it may be desirable to choose (meth)acrylate co-monomers which as homopolymers have Tg greater than 20° C. or even greater than 30° C. Examples of suitable (meth)acrylate monomers include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, bromoethyl methacrylate, 2-hydroxyethyl methacrylate, hydroxypropyl methacrylate, glycidyl methacrylate, allyl methacrylate, In some embodiments, in which the formed polymers are either adhesives or release materials, it may be desirable to include copolymerizable polar monomers. Examples of such polar monomers include: acid functional monomers such as acid functional (meth)acrylates; basic functional monomers such as (meth)acrylamides, substituted (meth)acrylamides, and amine-containing (meth)acrylates; and neutral polar monomers such as hydroxyalkyl (meth)acrylates, and cyanoalkyl (meth)acrylates.

Useful acidic functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, B-carboxyethyl acrylate, 2-sulfoethyl methacrylate, styrene sulfonic acid, 2-acrylamido-2-methylpropane sulfonic acid, vinyl phosphonic acid, and the like, and mixtures thereof. Due to their availability, typically ethylenically unsaturated carboxylic acids are used.

When acidic (meth)acrylate co-monomers are used, typically they are added in amounts ranging from about 2% by weight to about 30% by weight, or about 2% by weight to about 15% by weight, relative to the total monomer content. Generally, as the proportion of acidic monomers used in preparing the acidic copolymer increases, cohesive strength of the resulting polymer increases.

A wide variety of basic monomers are useful. In some embodiments, the basic monomer is a nitrogen-containing monomer, such as those of Formula 4:

$$R^{11}R^{12}C=CR^{13}-X_n-Y \qquad \text{Formula 4}$$

wherein
a is 0 or 1;
$R^{11}$, $R^{12}$, and $R^{13}$ are independently selected from H— and $CH_3$— or other alkyl group,
X is selected from an ester or amide group; and
Y is an alkyl group, a nitrogen-containing aromatic, nitrogen-containing group, such as the group:

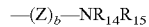
$$-(Z)_b-NR_{14}R_{15}$$

wherein
Z is a divalent linking group (typically about 1 to 5 carbon atoms);
b is 0 or 1; and
$R^{14}$ and $R^{15}$ are selected from hydrogen, alkyl, aryl, cycloalkyl, and alkaryl groups.

$R^{14}$ and $R^{15}$ in the above group may also form a heterocycle. In all embodiments, Y, $R^{11}$, and $R^{12}$ may also comprise heteroatoms, such as O, S, N, etc. While Formula 4 summarizes the majority of basic monomers useful in the present disclosure, other nitrogen-containing monomers are possible if they meet the definition of a basic monomer (i.e., can be titrated with an acid).

Exemplary basic monomers include N,N-dimethylaminopropyl methacrylamide (DMAPMAm); N,N-diethylaminopropyl methacrylamide (DEAPMAm); N,N-dimethylaminoethyl acrylate (DMAEA); N,N-diethylaminoethyl acrylate (DEAEA); N,N-dimethylaminopropyl acrylate (DMAPA); N,N-diethylaminopropyl acrylate (DEAPA); N,N-dimethylaminoethyl methacrylate (DMAEMA); N,N-diethylaminoethyl methacrylate (DEAEMA); N,N-dimethylaminoethyl acrylamide (DMAEAm); N,N-dimethylaminoethyl methacrylamide (DMAEMAm); N,N-diethylaminoethyl acrylamide (DEAEAm); N,N-diethylaminoethyl methacrylamide (DEAEMAm); N,N-dimethylaminoethyl vinyl ether (DMAEVE); N,N-diethylaminoethyl vinyl ether (DEAEVE); and mixtures thereof. Other useful basic monomers include vinylpyridine, vinylimidazole, tertiary amino-functionalized styrene (e.g., 4-(N,N-dimethylamino)-styrene (DMAS), 4-(N,N-diethylamino)-styrene (DEAS)), N-vinyl pyrrolidone, N-vinyl caprolactam, acrylonitrile, N-vinyl formamide, (meth)acrylamide, and mixtures thereof.

When basic co-monomers are used, typically they are added in amounts ranging from about 2% by weight to about 30% by weight, or about 2% by weight to about 15% by weight, relative to the total monomer content. Generally, as the proportion of basic monomers used in preparing the basic copolymer increases, cohesive strength of the resulting polymer increases.

Another useful class of co-monomers which may be included in the reaction mixture are co-monomers that may be described as copolymerizable initiators. This class of co-monomers comprise a free radically polymerizable group and an initiator group. The initiator group may be a thermally initiated group or a photoinitiated group. Comonomers which are copolymerizable photoinitiators are particularly suitable to provide crosslinking. This is particularly true for polymers which may be hot melt processed and subsequently crosslinked. This type of crosslinking, also known as post curing, usually comprises exposing the coated material to some form of radiant energy, such as electron beam, or ultraviolet light with the use of a chemical crosslinking agent. Examples of useful copolymerizable photoinitiators are disclosed, for example, in U.S. Pat. No. 6,369,123 (Stark et al.), U.S. Pat. No. 5,407,971 (Everaerts et al.), and U.S. Pat. No. 4,737,559 (Kellen et al.). The copolymerizable photocrosslinking agents either generate free radicals directly or abstract hydrogen atoms to generate free radicals. Examples of hydrogen abstraction type photocrosslinkers include, for example, those based on benzophenones, acetophenones, anthraquinones, and the like. Examples of suitable copolymerizable hydrogen abstraction crosslinking compounds include mono-ethylenically unsaturated aromatic ketone monomers free of orthoaromatic hydroxyl groups. Examples of suitable free-radical generating copolymerizable crosslinking agents include but are not limited to those selected from the group consisting of 4-acryloxybenzophenone (ABP), para-acryloxyethoxybenophenone, and para-N-(methacryloxyethyl)-carbamoylethoxybenophenone. Copolymerizable initiators, when used, are typically included in the amount of about 0% to about 2%, or in the amount of about 0.025% to about 0.5%, based on the total monomer content.

The reaction mixture also comprises a chain transfer agent. Chain transfer agents are well known in the polymerization art to control the molecular weight or other polymer properties. The term "chain transfer agent" as used herein also includes "telogens". Suitable chain transfer agents include, but are not limited to, those selected from the group consisting of carbon tetrabromide, hexanebromoethane, bromotrichloromethane, 2-mercaptoethanol, t-dodecylmercaptan, isooctylthioglycoate, 3-mercapto-1,2-propanediol, cumene, and mixtures thereof. Depending on the reactivity of a particular chain transfer agent and the amount of chain transfer desired, typically 0.1 to about 5 percent by weight of chain transfer agent is used, or 0.1 to about 1.0 percent by weight or even 0.1 to 0.5 percent by weight, based upon the total monomer content.

The reaction mixture also comprises at least one thermal initiator. Thermal initiators are species which generate free radicals upon heating. Many possible thermal free radical initiators are known in the art of vinyl monomer polymerization and may be used. Typical thermal free radical polymerization initiators which are useful herein are organic peroxides, organic hydroperoxides, and azo-group initiators which produce free radicals. Useful organic peroxides include but are not limited to compounds such as benzoyl peroxide, di-t-amyl peroxide, t-butyl peroxy benzoate, and di-cumyl peroxide. Useful organic hydroperoxides include but are not limited to compounds such as t-amyl hydroperoxide and t-butyl hydroperoxide. Useful azo-group initiators include but are not limited to the VAZO compounds manufactured by DuPont, such as VAZO 52 (2,2'-azobis(2,4-dimethylpentanenitrile)), VAZO 64 (2,2'-azobis(2-methylpropanenitrile)), VAZO 67 (2,2'-azobis(2-methylbutanenitrile)), and VAZO 88 (2,2'-azobis (cyclohexanecarbonitrile)). Additional commercially available thermal initiators include, for example, LUPERSOL 130 (2,5-dimethyl-2,5-Di-(t-butylperoxy)hexyne-3) available from Elf Atochem, Philadelphia, Pa., and LUPEROX 101 (2,5-dimethyl-2,5-di-(tert-butylperoxoxy) hexane) available from Arkema Canada, Inc., Oakville, When the initiator(s) have been mixed into the monomers, there will be a temperature above which the mixture begins to react substantially (rate of temperature rise typically greater than about 0.1° C./minute for essentially adiabatic conditions). This temperature, which depends on factors including the monomer(s) being reacted, the relative amounts of monomer(s), the particular initiator(s) being used, the amounts of initiator(s) used, and the amount of any polymer and/or any solvent in the reaction mixture, will be defined herein as the "runaway onset temperature". As an example, as the amount of an initiator is increased, its runaway onset temperature in the reaction mixture will decrease. At temperatures below the runaway onset temperature, the amount of polymerization proceeding will be practically negligible. At the runaway onset temperature, assuming the absence of reaction inhibitors and the presence of essentially adiabatic reaction conditions, the free radical polymerization begins to proceed at a meaningful rate and the temperature will start to accelerate upwards, commencing the runaway reaction.

A sufficient amount of initiator(s) typically is used to carry the polymerization to the desired temperature and conversion. If too much initiator(s) is used, an excess of low molecular weight polymer will be produced thus broadening the molecular weight distribution. Low molecular weight components can degrade the polymer product performance. If too little initiator is used, the polymerization will not proceed appreciably and the reaction will either stop or will proceed at an impractical rate. The amount of an individual initiator used depends on factors including its efficiency, its molecular weight, the molecular weight(s) of the monomer(s), the heat(s) of reaction of the monomer(s), the types and amounts of other initiators included, etc. The total initiator amount, that for all initiator(s), typically is used in the range of about 0.0005 weight % to about 0.5 weight % or in the range of about 0.001 weight % to about 0.1 weight % based on the total monomer content.

When more than one initiator is used in the reaction, as the first initiator depletes during an essentially adiabatic reaction (with the corresponding increasing reaction temperature), the second initiator may be selected such that it is thermally activated when the first initiator is becoming depleted. That is, as the first initiator is depleting, the reaction has brought the reaction mixture to the runaway onset temperature for the second initiator in the reaction mixture. An overlap is preferred such that before one initiator completely depletes another initiator activates (reaches its runaway onset temperature). Without an overlap, the polymerization rate can slow or essentially stop without external heating to bring the mixture to the runaway onset temperature of the next initiator in the series. This use of external heating defeats one of the benefits of the inventive process by adding the potential for nonuniform temperature distribution in the reaction mixture due to the external heating. However, polymerization still occurs under essentially adiabatic conditions.

Until the temperature increases towards the runaway onset temperature for an individual initiator in the batch, the initiator is essentially dormant, not appreciably decomposing to form free radicals. It will remain dormant until the reaction temperature increases towards its runaway onset temperature in the reaction mixture and/or until external heat is applied.

The succession of one initiator depleting and another reaching its runaway onset temperature can continue as the temperature rises for virtually any number of thermal initiators in the reaction system. In the limit, a succession of virtually an infinite number of different initiators could be used with nearly complete overlap of the active temperature ranges between adjacent initiators in the succession to bring about the polymerization and the corresponding adiabatic temperature rise. In this case, the amount of each initiator used would need to be virtually infinitesimally small so as to not detrimentally broaden the molecular weight distribution.

Practically, to minimize raw material handling requirements, a reasonable minimum number of initiators should be used to achieve the desired amount of adiabatic polymerization and obtain the necessary polymer properties. Typically, 1 to 5 different initiators (more typically 2 to 5) are used during a particular reaction cycle. In some circumstances it may be advantageous to use 2, 3, 4, or 5 different initiators per reaction cycle.

To estimate the amount of overlap between successive initiators in a series during an essentially adiabatic polymerization, standard polymerization modeling techniques can be employed as described in U.S. Pat. No. 5,986,011 (Ellis).

In the case that there will be more than one reaction cycle, the initiator(s) for the first essentially adiabatic reaction cycle are typically selected to bring the reaction to a temperature/conversion level where:

1) The polymerization reaction virtually stops when the initiator(s) have essentially depleted (i.e., initiator(s) more than 99% depleted). The temperature of the reaction mixture is such that thermal polymerization of the monomers (polymerization in the absence of added free radical initiators) in the polymer/monomer reaction mixture is practically negligible. This is important so that the reaction can be stopped with available heat transfer from the reactor jacket (and potentially augmented with external cooling such as that from external cooling from pumping the reaction fluid through a heat exchanger, etc.).

2) The solution viscosity is such that when the reaction mixture is cooled prior to the next reaction cycle, the next initiator(s), optional chain transfer agent, optional additional monomers, optional polymer, etc., can be mixed into the batch. This viscosity will be typically less than about 200,000 centipoise (Brookfield viscosity at mixing temperature) for a common batch reactor system.

Typically the polymerization reactions of this disclosure proceed as follows. The monomers are charged to the reactor in the desired amounts. The temperature of the reaction vessel must be cool enough so that virtually no thermal polymerization of the monomers will occur and also cool enough so that virtually no polymerization will occur when the initiator(s) are added to the batch. Also, care should be taken to ensure the reactor is dry, in particular, free of any undesired volatile solvent (such as reactor cleaning solvent) which potentially could dangerously elevate the pressure of the reaction vessel as the temperature increases due to heat of polymerization. The initiator(s), chain transfer agents, and optional additional materials are also charged to the reactor.

Prior to warming the reaction mixture as described below (or optionally simultaneously while warming the batch), after adding all components to the batch as described above, the batch is purged of oxygen, a free-radical polymerization inhibitor. De-oxygenation procedures are well known to those skilled in the art of free-radical polymerization. For example, de-oxygenation can be accomplished by bubbling an inert gas such as nitrogen through the batch to displace dissolved oxygen.

After completing the de-oxygenation, the head space in the reactor is typically pressurized with an inert gas such as nitrogen to a level necessary to suppress boiling of the reaction mixture as the temperature rises during reaction. The inert gas pressure also prevents oxygen from entering the polymerization mixture through possible small leaks in the reaction equipment while polymerization is in progress.

From heating provided by the jacket on the reactor, the reaction mixture temperature typically is raised to or in a range about 1° C. to about 5° C. above the runaway onset temperature with sufficient mixing in the batch to have an essentially uniform temperature in the batch. The batch temperature controller is typically set temporarily to maintain the batch at the runaway onset temperature. Once the jacket temperature begins to drop as necessary to hold the batch at the runaway onset temperature, this indicates that the polymerization has begun. The reaction may not proceed immediately when the batch is brought to the runaway onset temperature because it may take time to deplete reaction inhibitors that are typically shipped with the monomer (to prevent unwanted polymerization during shipping and handling), other trace impurities, or any oxygen still dissolved in the reaction mixture. As soon as the jacket temperature drops, the reactor jacket temperature control system is set to track the batch temperature as it increases, due to reaction, to facilitate essentially adiabatic reaction conditions. In practice, it has been found beneficial to have the jacket track about 1° C. to about 10° C. above the batch to warm the reactor walls from the jacket as opposed to warming the reactor walls from the heat of reaction of the mixture, making the reacting system more adiabatic. Acknowledged is the fact that perfect adiabiticity is probably not attainable because there will typically be a small amount of heat transferred from the reacting medium to the internal agitator blades and shaft as well as the mixing baffles in the reactor. In practice, the effect of heat loss to heating the agitator shaft and blades, baffles, temperature probes, etc., has been found to be negligible.

An alternate heating approach would be to gently warm the batch past the runaway onset temperature with heat input from the jacket to warm the batch at a rate of about 0.1° C./min to about 0.5° C./min and continue the heating through the reaction cycle (similar to the heating approach above with the jacket tracking about 1° C. to about 10° C. above the batch temperature). As in the heating approach above, continued heating through the reaction cycle would serve to offset the heat loss to the reaction equipment and maintain essentially adiabatic reaction conditions. In practice, the first heating approach described above appears preferable because it ensures the reaction will always commence at the same temperature which seems to produce more reproducible product from batch to batch.

Once the reaction temperature has peaked, due to the depletion of the thermal initiator(s) as well as negligible reaction of the monomers from thermal polymerization, the polymer content at this point is typically about 30-80% by weight based on the total weight of monomer(s) and polymer.

If desired, the polymerization cycles can be stopped at this point and the unreacted monomer stripped from the reaction mixture or further polymerized in other equipment. Stripping apparatuses for the purpose of removing residual monomer are well known to those skilled in polymerization art. One potential stripping apparatus is an extractor-extruder operating with sections vented to vacuum chambers wherein the monomer can be condensed and optionally reused in subsequent polymerizations. Typical extractor-extruders are referred to in Modern Plastics Encyclopedia, Volume 45, October 1968 and Volume 46, October 1969, both published by McGraw-Hill.

A potential benefit of stopping the polymerization without reacting to completion is that the molecular weight distribution has been found to broaden as conversion increases towards completion. Product property requirements could warrant the extra effort and cost of stripping versus reacting to completion. Another reason to cease the polymerization process at partial conversion would be to limit the solution viscosity at manageable levels. For example, as the polymer molecular weight increases, the solution viscosity will increase. If high molecular weight polymer is to be produced and the 100% conversion melt viscosity is not manageable, i.e. greater than about 200,000 to about 500,000 centipoise (Brookfield viscosity at temperature), stopping the reaction at less than 100% conversion could be beneficial.

When the reaction system is to be further polymerized in one or more essentially adiabatic reaction cycles, the batch temperature typically is cooled prior to beginning the next reaction cycle. Generally the batch is cooled about 5-20° C. below the runway onset temperature of the initiator used in the next reaction cycle. If more than one initiator is used the batch temperature is typically cooled at least about 5-20° C. below the runaway onset temperature of the initiator having the lowest runaway onset temperature.

As the partially polymerized reaction mixture cools, its viscosity will increase. Optionally, if necessary, additional monomer(s) can be added to the batch before it has fully cooled to compensate for the increasing viscosity. Typically, if necessary, a relatively small amount will be added. Charging additional monomer in the amount less than about 30 weight % of the amount of monomer added in the first reaction cycle is preferred. While the batch is cooling or when it has cooled to the desired temperature, optionally more monomer(s) can be added to adjust monomer ratios to compensate for unequal reactivity ratios of the monomers in the previous reaction cycle. Similarly, monomer(s) not included in an earlier reaction cycle can be added to tailor the polymer properties as needed. Monomer addition may also be performed as an in-process correction to compensate for slight batch-to-batch variations in the amount of reaction conversion obtained in a previous reaction cycle.

When the batch has cooled to the desired temperature, the additional initiator(s) are added to the batch. Optionally, additional chain transfer agent(s) can be added. Adjusting the amount of chain transfer agent can provide an in-process correction for the product molecular weight obtained from the previous reaction cycle. Other additives, including optional photocrosslinking agents, and optional solvent, can also be added at this time.

The batch is de-oxygenated, warmed to the runway onset temperature of the initiator having the lowest runaway onset temperature, and reacted essentially adiabatically as described above for the previous reaction cycle.

If necessary, additional reaction cycles can be performed to continue increasing conversion to the desired level.

Optionally, when all of the reaction cycles are complete, unreacted monomer can be stripped from the batch by pulling vacuum on the hot reaction product in the batch reactor by external vacuum equipment such as a vacuum pump and optionally condensing monomer vapors in an external heat exchanger with cooling.

The reaction mixture's viscosity at the temperature at the end of the final reaction cycle is typically less than about 200,000 to about 500,000 centipoise (Brookfield viscosity at draining temperature) to permit draining of the molten polymer from the reactor and optionally mixing additives into the batch. Typically, inert gas (such as nitrogen) pressure in the head space of the reactor car be used to hasten the draining of the product from the reactor.

After the reaction mixture is drained, an apparatus such as an extractor-extruder can be used to strip unreacted monomer and/or any solvent that optionally was added to the batch, or further process the polymer by mixing in additives comprising plasticizers, tackifiers, antioxidants and/or stabilizers, and extruding the polymer into the physical form that it is intended to be used (i.e. in sheet form for a pressure sensitive adhesive or a release material). One particularly useful antioxidant is IRGANOX 1010 (tetrakis(methylene (3,5-di-tert-butyl-4-hydroxyhydrocinnamate))methane) available from Ciba Specialty Chemicals, Tarrytown, N.Y. The silicone-containing copolymer can also be dissolved in a solvent to permit the polymer to be solvent coated.

The silicone-containing copolymers may be adhesives, especially pressure sensitive adhesives. The adhesive composition may be coated in a variety of different ways, either out of solvent or via hot-melt coating to form adhesive articles. In some embodiments the coating process may be followed by crosslinking, such as, for example by photocrosslinking by exposure to actinic radiation such as UV light.

When the adhesive composition is solvent coated, it may be applied by any conventional application method, including but not limited to gravure coating, curtain coating, slot coating, spin coating, screen coating, transfer coating, brush or roller coating, inkjet printing and the like. The thickness of a coated adhesive layer, typically in the form of a liquid is in part dependent on the nature of the materials used and the specific properties desired. Exemplary thicknesses of an adhesive layer may be in the range from about 1 to about 250 micrometers, 12 to about 200 micrometers or about 25 to 100 micrometers.

When hot melt processing is used, the adhesive composition can be formed into a film or coating by either continuous or batch processes. An example of a batch process is the placement of a portion of the adhesive between a substrate to which the film or coating is to be adhered and a surface capable of releasing the adhesive film or coating to form a composite structure. The composite structure can then be compressed at a sufficient temperature and pressure to form an adhesive coating or film of a desired thickness after cooling. Alternatively, the adhesive can be compressed between two release surfaces and cooled to form an adhesive transfer tape useful in laminating applications. As with solvent coated processes, the thickness of the adhesive coating may be in the range from about 1 to about 250 micrometers, 12 to about 200 micrometers or about 25 to 100 micrometers.

Continuous forming methods include drawing the adhesive out of a film die and subsequently contacting the drawn adhesive to a moving plastic web or other suitable substrate. A related continuous method involves extruding the adhesive and a coextruded backing material from a film die and cooling the layered product to form an adhesive tape. Other continuous forming methods involve directly contacting the adhesive to a rapidly moving plastic web or other suitable preformed substrate. Using this method, the adhesive is applied to the moving preformed web using a die having flexible die lips, such as a rotary rod die. After forming by any of these continuous methods, the adhesive films or layers can be solidified by quenching using both direct methods (e.g., chill rolls or water baths) and indirect methods (e.g., air or gas impingement).

The adhesive composition may be disposed on a substrate either by solvent coating or hot melt coating. The substrate may be a release liner, a rigid surface, a tape backing, a film, or a sheet. The adhesive composition can be coated onto a release liner, coated directly onto a substrate, a film or a backing, or formed as a separate layer (e.g., coated onto a release liner) and then laminated to a substrate or film. In some embodiments the adhesive is a transfer tape, i.e. it is disposed between two release liners.

In some embodiments it may be desirable to impart a microstructured surface to one or both major surfaces of the adhesive. It may be desirable to have a microstructured surface on at least one surface of the adhesive to aid air egress during lamination. If it is desired to have a microstructured surface on one or both surfaces of the adhesive film, the adhesive coating or film may be placed on a tool or a liner containing microstructuring. The liner or tool can then be removed to expose an adhesive film having a microstructured surface. Generally with optical applications it is desirable that the microstructure disappear over time to prevent interference with optical properties.

The substrate included in the adhesive article can contain polymeric materials, glass materials, ceramic materials, metal-containing materials (e.g., metals or metal oxides), or a combination thereof. The substrate can include multiple layers of material such as a support layer, a primer layer, a hard coat layer, a decorative design, and the like. The substrate can be permanently or temporarily attached to an adhesive film. For example, a release liner can be temporarily attached and then removed for attachment of the adhesive film to another substrate.

The substrate can have a variety of functions such as, for example, providing flexibility, rigidity, strength, support, or optical properties such as, for example, reflectivity, antireflectivity, polarization, or transmissivity (e.g., selective with respect to different wavelengths). That is, the substrate can be flexible or rigid; reflective or non-reflective; visibly clear, colored but transmissive, or opaque (e.g., not transmissive); and polarizing or non-polarizing.

Representative examples of polymeric substrates include those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes and polypropylenes, polyvinyl chlorides, polyimides, cellulose triacetates, acrylonitrile-butadiene-styrene copolymers, and the like.

In other embodiments, the substrate is a release liner. Any suitable release liner can be used. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048. The liner can have a microstructure on its surface that is imparted to the adhesive to form a microstructure on the surface of the adhesive film. The liner can then be removed to expose an adhesive film having a microstructured surface.

The silicone-containing copolymer may be used alone as an adhesive or it may contain a variety of additives. For example, additional adhesive polymers or elastomeric polymers may be blended with the silicone-containing copolymer to form the adhesive composition. Additionally, other optional property modifying additives can be mixed with the adhesive composition. Typical property modifiers include tackifying agents (tackifiers) and plasticizing agents (plasticizers) to modify the adhesive performance of the formed adhesive composition. In addition, other property modifiers, such as fillers, may be added if desired, provided that if and when incorporated, such additives are not detrimental to the properties desired in the final composition. Fillers, such as fumed silica, fibers (e.g., glass, metal, inorganic, or organic fibers), carbon black, glass or ceramic beads/bubbles, particles (e.g., metal, inorganic, or organic particles), polyaramids (e.g., those available from DuPont Chemical Company; Wilmington, Del. under the trade designation, KEVLAR), and the like which can be added in amounts up to about 30% by weight. Other additives such as dyes, inert fluids (e.g., hydrocarbon oils), pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these systems in amounts of generally from about 1 to about 50 percent by total volume of the composition.

The silicone-containing copolymers may be release materials. Release materials are materials that exhibit low adhesion to an adhesive, such as a pressure sensitive adhesive, so that separation can occur substantially between the adhesive and release material interface. Release coatings can be used as a "liner" for adhesive articles, such as labels or medical dressing bandages, and the like where the adhesive article is generally supplied as a sheet-like construction, as opposed to a roll-like construction. In tape applications, a release material is often referred to as a "low adhesion backsize," or LAB. In this form, the adhesive surface contacts the back surface of the article. The LAB prevents the adhesive from permanently adhering to the back surface of the article and allows that article to be unwound.

A wide variety of release articles may be prepared using the silicone-containing polymers of this disclosure. Among the articles are release liners, tape constructions, and sheet constructions. Generally, the release performance requirements are different for release liners than for LAB materials.

Typically it is desirable to have higher adhesion levels between the adhesive and the release components in tape constructions (LABs) because it is desirable for the tape to not spontaneously unroll. Spontaneous unrolling and similar phenomena may occur if the adhesion level between the release and adhesive component are too low.

The composition of the copolymer is such as to provide the copolymer with a surface release value not greater than about 50 N/dm. It should be understood that this upper limit of 50 N/dm applies to use with highly aggressive pressure sensitive adhesives which have peel adhesion values of 100 N/dm or higher. Pressure sensitive adhesives as a group may be categorized into three broad categories (1) low (5-15 N/dm), (2) intermediate (25-50 N/dm), and (3) high (60-100 plus N/dm) peel adhesion ranges. The degree of release can be selected to match the aggressiveness of the pressure sensitive adhesive with which it will be in contact and it is only for the most aggressive pressure sensitive adhesives that a release value as high as 50 N/dm would be selected. Release coatings for less aggressive pressure sensitive adhesives would be selected to be correspondingly lower.

Coatings of the silicone-containing copolymer of this disclosure may have release levels for a given pressure sensitive adhesive that can be systematically changed from a tight low adhesion backsize level (15 to 30 N/dm) to a premium release liner level (0.2 to 0.6 N/dm) by variation in the amount and type of silicone present. This, coupled with utility for a variety of pressure sensitive adhesive types, allows for these release materials to satisfy a wide range of application needs. Since silicone constitutes only a portion of the coating (even at easy levels of release suitable for release liner applications), these copolymer compositions provide a potential cost savings over conventional 100% silicone release compositions and numerous blends.

The release composition may be coated in a variety of different ways, either out of solvent or via hot-melt coating, including by co-extrusion, to form articles. In some embodiments the coating process may be followed by crosslinking, such as, for example by photocrosslinking by exposure to actinic radiation such as UV light.

When the release composition is solvent coated, it may be applied by any conventional application method, including but not limited to gravure coating, curtain coating, slot coating, spin coating, screen coating, transfer coating, brush or roller coating, inkjet printing and the like. The thickness of a coated release layer, typically in the form of a liquid is in part dependent on the nature of the materials used and the specific properties desired. Exemplary thicknesses of a release layer may be in the range from about 0.01 to about 2.5 micrometers, or about 0.5 to 1.0 micrometers.

When hot melt processing is used, typically continuous processes are used. Continuous forming methods include drawing the release material out of a film die and subsequently contacting the drawn release material to a moving plastic web or other suitable substrate. A related continuous method involves extruding the release material and a coextruded backing material from a film die and cooling the layered product to form a release article. Other continuous forming methods involve directly contacting the release material to a rapidly moving plastic web or other suitable preformed substrate. Using this method, the release material is applied to the moving preformed web using a die having flexible die lips, such as a rotary rod die. After forming by any of these continuous methods, the release films or layers can be solidified by quenching using both direct methods (e.g., chill rolls or water baths) and indirect methods (e.g., air or gas impingement).

The release coatings may comprise the silicone-containing copolymer alone, or may comprise such copolymers blended with a compatible homopolymer, copolymer, etc. The low percentage of silicone block contained in the copolymers makes the copolymers readily compatible with polymers of similar composition to the vinyl polymeric blocks or segments. Examples of suitable polymers and copolymers include, for example, thermoplastic polymers such as olefins, polyesters, or renewable polymers such as polylactic acid, and the like. Particularly suitable polymers include olefins such as polyethylene, polypropylene, copolymers of ethylene and propylene, and the like. Fillers or pigments (e.g., alumina, silica, titania, or calcium carbonate) may, of course, be added to the copolymer compositions to reduce gloss and also impart a surface texture that is more receptive to marking with pencils and roller ball pens.

A blend of the silicone-containing copolymer and a thermoplastic polymer may be coated onto a substrate via coating (such as hot melt coating) or coextrusion, or the blend may be extruded as a stand alone film.

The silicone-containing release copolymers may be used as a coating for a solid substrate, which may be a sheet, fiber, or shaped object. Among the preferred substrates are flexible substates used for pressure sensitive adhesive products. Suitable substrates include paper, metal sheets and foils, non-woven fabrics, and films of thermoplastic resins such as polyesters, polyamides, polyolefins, polycarbonates, polyvinyl chloride, etc., although any surface requiring release toward adhesives can be used. Primers known in the art can be utilized to aid in adhesion of the coating to the substrate, but they are not generally necessary.

The release coating compositions may be applied to suitable substrates by means of conventional coating techniques such as wire-wound rod, direct gravure, offset gravure, reverse roll, air-knife, and trailing blade coating; hot melt coating is also possible. The resultant coatings provide effective release for a wide variety of conventional pressure sensitive adhesives such as natural rubber-based, acrylic, and other synthetic film-forming elastomeric materials.

The present disclosure provides a roll of tape which includes a flexible backing member, a pressure sensitive adhesive coating one major surface of the backing member, and a release coating on the opposite major surface of the backing comprising the polymer defined above. The disclosure further provides a tape comprising a flexible backing member, a pressure sensitive adhesive coating one major surface of the backing member and a release liner comprising a flexible sheet coated over the major surface adhered to the pressure sensitive coating with the copolymer defined above. The disclosure further provides a transfer tape comprising a film of pressure sensitive adhesive between two release liners, at least one being coated with the copolymer.

The disclosure also provides a coated sheet material wherein the release agent is on one side of the sheet and the adhesive is on the other side. The disclosure further provides a coated sheet material wherein the adhesive is a normally tacky and pressure sensitive adhesive. The disclosure also provides a stack of superimposed sheets of the coated sheet material, the pressure sensitive adhesive on each sheet being in contact with the release agent on an immediately adjacent sheet.

The disclosure also provides a fanfolded web formed from the coated sheet material, the adhesive on each segment of the web being in contact with the release agent on an immediately adjacent segment. The disclosure also provides the coated sheet material wherein the adhesive is present in a band adjacent one edge of the sheet. The disclosure also provides a stack of individual sheets formed from the coated sheet material, the adhesive bands of adjacent sheets lying along opposite edges. The disclosure further provides a coated sheet material having a release agent on one side and an adhesive on the other side wherein said coated sheet material can be wound convolutedly on itself about a core to form a roll. The disclosure further provides the coated sheet material wherein the adhesive is a normally tacky pressure sensitive adhesive.

The disclosure further provides a coated sheet material wherein the release agent covers a first portion of one side and a normal tacky and pressure sensitive adhesive covers a second portion of the same side. The disclosure further provides a coated sheet material wherein the sheet is an elongate strip having spaced alternating areas of release agent and an adhesive. The disclosure also further provides the coated sheet material wherein the sheet is generally rectangular, the release agent being present in a band adjacent one edge and the pressure sensitive adhesive being present in a band adjacent the opposite edge.

The silicone-containing copolymers comprising the release coating have a well-defined structure. When such copolymers are coated on a substrate, the silicone segment is thought to present a low energy, "siliconized" release surface, and the higher energy copolymerized polymeric blocks or segments are thought to provide adhesion to the base material. Similarly, if the silicone-containing copolymers are coextruded with other polymeric materials to form a release article, the higher energy copolymerized blocks or segments are thought to provide improved compatibility with these materials. The chemical nature or composition of the higher energy copolymerized blocks or segments can be modified independently of the free radically polymerizable silicone-containing monomer(s) to alter properties other than the release properties. Such properties include, for example, adhesion to the substrate, water dispersability, ink receptivity, etc. which can be altered without any serious perturbation of the surface characteristics of the film. The release properties of the coating are determined by both the silicone content (weight percentage) of the copolymer and the molecular weight of the silicone segment, with higher silicone content and/or molecular weight providing easier release. A copolymer or copolymer blend can, therefore, be chemically tailored to provide a specific level of release which can be reproduced with consistency, thus making possible the variation of the release properties of a backing over a range of values in a controlled fashion.

The silicone-containing release copolymers of this disclosure can be used to prepare structured adhesive articles. Several approaches to structuring adhesives are known, including those shown in, for example, U.S. Pat. Nos. 5,296,277 and 5,362,516 (both Wilson et al.); U.S. Pat. Nos. 5,141,790 and 5,897,930 (both Calhoun et al.); and U.S. Pat. No. 6,197,397 (Sher et. al). These patents disclose how the structure in the adhesive is built from the interface between the adhesive and the release liner.

These release liners are generally manufactured by structuring a thermoplastic polymer surface of the liner. Current methods of making release liners having microstructured patterns include cast extrusion onto a microstructured tool that imparts the desired pattern to the liner followed by silicone release coating where required, or by pressing a pattern into a thermoplastic polymer surface, with or without a silicone release coating, between structured nips to impart a pattern. These manufacturing steps form the topography on the liner, which is then used to impart topography into an adhesive.

EXAMPLES

These examples are merely for illustrative purposes only and are not meant to be limiting on the scope of the appended claims. All parts, percentages, ratios, etc. in the examples and the rest of the specification are by weight, unless noted otherwise. Solvents and other reagents used were obtained from Sigma-Aldrich Chemical Company; Milwaukee, Wis. unless otherwise noted.

Table of Abbreviations

| Abbreviation or Trade Designation | Description |
|---|---|
| Initiator-1 | Thermal free radical initiator of 2,2'-azobis(2,4 dimethylpentanenitrile) commercially available from E.I. duPont de Nemours &Co, Wilmington, DE as "VAZO 52". |
| Initiator-2 | Thermal free radical initiator of 2,2'-azobis(cyclohexanecarbonitrile) commercially available from E.I. duPont de Nemours &Co, Wilmington, DE as "VAZO 88". |
| Antioxidant-1 | Antioxidant tetrakis(methylene(3,5-di-tert-butyl-4-hydroxyhydrocinnamate))methane commercially available from Ciba Specialty Chemicals, Tarrytown, NY as "IRGANOX 1010". |
| Initiator-3 | Thermal free radical initiator of 2,2'-azobis(2-methylbutyronitrile) commercially available from E.I. duPont de Nemours &Co, Wilmington, DE as "VAZO 67". |
| Initiator-4 | Thermal free radical initiator of 2,5-dimethyl-2,5-Di-(t-butylperoxy)hexyne-3 commercially available from Elf Atochem, Philadelphia, PA as "LUPERSOL 130". |
| Initiator-5 | Thermal free radical initiator of azo-bis(isobutyronitrile) commercially available from E.I. duPont de Nemours &Co, Wilmington, DE as "VAZO 64". |
| Initiator-6 | Thermal free radical initiator of 2,5-dimethyl-2,5-di-(tert-butylperoxoxy)hexane commercially available from Arkema Canada, Inc., Oakville, ON as "LUPEROX 101". |
| IOA | Isooctyl acrylate |
| ABP | Copolymerizable photoinitiator of 4-acryloxy benzophenone, prepared according to U.S. Pat. No. 4,737,559 (Kellen et al.). |
| IOTG | Isooctylthioglycoate commercially available from Dow Chemical, Midland, MI. |

Table of Abbreviations

| Abbreviation or Trade Designation | Description |
|---|---|
| SiMac | Silicone macromer, methacrylate terminated polydimethylsiloxane, prepared as described in Synthesis Example S1 below. |
| EA | Ethyl acetate |
| PET Film | An aminated-polybutadiene primed polyester film of polyethylene terephthalate having a thickness of 38 micrometers. |
| ODA | Octadecyl acrylate |
| MA | Methyl acrylate |
| AA | Acrylic Acid |
| MMA | Methyl methacrylate |
| MAA | Methacrylic acid |
| AN | Acrylonitrile |
| MFS | Mercapto-functional polydimethylsiloxane, commercially available from ShinEtsu Silicones, Akron, OH as "KF-2001". |
| LDPE | Low density polyethylene, commercially available as EXXON 129.24 from ExxonMobil, Houston, TX. |
| Additive-1 | A color concentrate of 4% of silver black #3 in LDPE resin available from PolyOne, Elk Grove Village, IL as "CC10100332WE". |
| Additive-2 | A light stabilizer concentrate in LDPE available from Ampacet Corp., Tarrytown, NY as "10407". |
| Packaging Tape | Tape of 4.8 centimeter (1.88 inch) width commercially available from 3M Company, St. Paul, MN as "3M SCOTCH Box Sealing Tape3750". The tape was cut to 2.54 centimeter (1 inch) width for use in the testing. |
| THF | tetrahydrofuran |

Test Methods
Inherent Viscosity (IV)

Average inherent viscosities (IV) were measured at 30° C. using a Canon-Fenske viscometer (Model No. 50 P296) in a THF solution at 30° C. at a concentration of 0.2 g/dL. Inherent viscosities of the materials tested were found to be essentially independent of concentration in the range of 0.1 to 0.4 g/dL. The average inherent viscosities were averaged over 3 or more runs. Any variations for determining average inherent viscosities are set forth in specific Examples.

180° Peel Adhesion

This peel adhesion test is similar to the test method described in ASTM D 3330-90, substituting a glass substrate for the stainless steel substrate described in the test. Adhesive coatings on polyester film were cut into 1.27 centimeter by 15 centimeter strips. Each strip was then adhered to a 10 centimeter by 20 centimeter clean, solvent washed glass coupon using a 2-kilogram roller passed once over the strip. The bonded assembly dwelled at room temperature for about one minute and was tested for 180° peel adhesion using an IMASS slip/peel tester (Model 3M90, commercially available from Instrumentors Inc., Strongsville, Ohio) at a rate of 2.3 meters/minute (90 inches/minute) over a five second data collection time. Two samples were tested; the reported peel adhesion value is an average of the peel adhesion value from each of the two samples. The data was recorded in ounces per inch and converted to Newtons per decimeter (N/dm).

Release Test

Samples were prepared for release testing by attaching laminates of adhesive tape on the experimental release film to a 15.2 centimeter by 30.5 centimeter glass panel using double-coated adhesive tape (commercially available from 3M Company under the trade designation "410B") via the non-release side of the release film using a 2 kg rubber roller. The laminated adhesive tape was then peeled from the experimental release liner at 180° at a rate of 2.3 meters/minute (90 inches/minute). All tests were done in a facility at constant temperature (20° C.) and constant humidity (50% RH). In the case of shocky peel, the minimum, maximum and average peel values are all reported to indicate the level of shockiness and a description of the peel was also included. To determine the readhesion value, the peeled adhesive tape was applied to the surface of a clean glass plate by means of a 2 kg rubber roller. The readhesion value was a measure of the force required to pull the tape from the glass surface at an angle of 180° at a rate of 2.3 meters/minute (90 inches/minute). The peel tester used for all examples was an IMass slip/peel tester (Model 3M90, commercially available from Instrumentors Inc., Strongville, Ohio). Measurements were obtained in ounces/inch and converted to Newtons per decimeter.

SYNTHESIS EXAMPLES

Synthesis Example S1: Preparation of SiMac

A methacrylate-terminated polydimethylsiloxane macromer was prepared as described in U.S. Pat. No. 4,693,935 (Mazurek) "Monomer C 3b". The macromer, having an average molecular weight of about 10,000 grams/mole, was prepared using BuLi initiator. A flame-dried 1 liter three-necked flask equipped with a mechanical stirrer, condenser, and septum and purged with dry argon was charged with a dilute solution of $D_3$ (1 gram) in heptane (100 milliliters), both freshly dried. 5.5 milliliters of BuLi (1.7 M in hexane) (9.35 mmoles) was introduced and the initiation reaction was continued overnight at room temperature. 198.7 grams (0.89 mole) of $D_3$ in THF (496.8 g) was introduced into the reaction flask via polytetrafluoroethylene (PTFE) tubing and the polymerization was continued for 8 hours with the reaction mixture maintained at room temperature. Progress of the reaction was monitored by GC analysis of the reaction mixture. Thereafter the capping agent, 3-methacryloxypropyldimethylchlorosilane (2.26 g, 10.3 mmoles), was introduced and the reaction mixture was stirred for 1 hour, while additionally agitated with an ultrasonic bath which raised the temperature to about 40° C. The resultant polymer solution was poured into an excess of methanol with vigorous stirring. The separated polymer fraction was dissolved in ethyl ether and washed with water. The organic layer was dried with magnesium sulfate, filtered, and evaporated. The resultant polymer did not contain detectable quantities of low molecular weight materials, such as oligomeric siloxanes. The macromer produced was analyzed by gel permeation chromatography which gave the following results: $M_n=12,881$, $M_w=14,756$, and polydispersity of 1.14.

Comparative Example C-1

A sample was prepared as described in U.S. Pat. No. 4,693,935 (Mazurek) Example 64. In a glass reaction bottle was placed 83 parts by weight IOA, 7 parts by weight AA, 10 parts by weight SiMac, 0.3 parts by weight Initiator-5 and 150 parts by weight EA. The reaction bottle was purged with nitrogen and sealed. It was placed in a 55° C. bath and tumbled therein for 24 hours. The resulting polymer solution was diluted with 250 parts by weight EA and knife coated onto a PET film and dried to provide a dry coating thickness of 25 micrometers.

Examples 1-4

For Examples 1-4 essentially adiabatic polymerizations were carried out by a two step reaction within a VSP2 adiabatic reaction apparatus equipped with a 316 stainless steel test can (available from Fauske and Associates Inc, Burr Ridge Ill.). In the VSP2 reaction vessel was placed IOA, AA, SiMac, Initiator-1, IOTG and ABP in the amounts shown in Table 1. The reactor was sealed and purged of oxygen. The reaction mixture was heated to 60° C. and the reaction proceeded adiabatically. Typical reaction peak temperature was 150° C. When the reaction was complete, the mixture was cooled to below 50° C. To the reaction product of the first step was added 0.7 grams of a mixture, (the contents of the additive mixture are shown in Table 2) and 0.2188 grams of ABP. The reactor was sealed and purged of oxygen. The reaction mixture was heated to 60° C. and the reaction proceeded adiabatically. Typical reaction peak temperature was 160° C. The samples were removed from the reactor, Inherent Viscosity (IV) was measured using the Test Method given above and is shown in Table 3. The polymer samples were dissolved in THF at approximately 30% solids. The polymer solutions were knife coated onto a PET film and dried to provide a dry coating thickness of 25 micrometers. The coated samples were post-crosslinked by passing under a high intensity UV source ("D" or "H" bulb) such that each pass gave a UV dose of 600 milliJoules per square centimeter. Samples were tested for 180° Peel Adhesion using the Test Method given above, both immediately after adhering and after dwelling for 24 hours. These data are shown in Table 3.

TABLE 1

| Example | IOA (parts) | AA (parts) | SiMac (parts) | Initiator-1 (parts) | IOTG (parts) | ABP (parts) |
|---|---|---|---|---|---|---|
| 1 | 85 | 10 | 5 | 0.004 | 0.045 | 0.3125 |
| 2 | 80 | 10 | 10 | 0.004 | 0.06 | 0.3125 |
| 3 | 80 | 10 | 10 | 0.004 | 0.08 | 0.3125 |
| 4 | 80 | 10 | 10 | 0.004 | 0.15 | 0.3125 |

TABLE 2

| Example Additive Mixture | IOTG (parts) | Initiator-1 (parts) | Initiator-2 (parts) | Initiator-4 (parts) | EA (parts) |
|---|---|---|---|---|---|
| 1 | 4.2 | 0.5 | 0.1 | 0.15 | 45.05 |
| 2 | 5.58 | 0.5 | 0.1 | 0.15 | 43.67 |
| 3 | 7.44 | 0.5 | 0.1 | 0.15 | 41.81 |
| 4 | 13.95 | 0.5 | 0.1 | 0.15 | 35.3 |

TABLE 3

| Example | IV (dl/g) | UV Cure (Number of passes) | Initial 180° Peel Adhesion (N/dm) | 180° Peel Adhesion after 24 Hour Dwell (N/dm) |
|---|---|---|---|---|
| 1 | 0.55 | 1 | 8.6 | 110.7 |
| 2 | 0.62 | 1 | 1.9 | 100.3 |
| 3 | 0.37 | 3 | 40.3 | 111.0 |
| 4 | 0.29 | 4 | 8.6 | 100.4 |
| C1 | 0.61 | NA | 42.6 | 88.5 |

NA = Not Applicable

Examples 5-7

For Examples 5-7 essentially adiabatic polymerization was carried out by a two step reaction within a VSP2 adiabatic reaction apparatus equipped with a 316 stainless steel test can (available from Fauske and Associates Inc, Burr Ridge Ill.). In the VSP2 reaction vessel was placed ODA, AN, MA, AA, IOTG and SiMac or MFS in the amounts shown in Table 4. To the mixture was added 0.1 grams of Antioxidant-1 and 1.03 grams of a mixture (the contents of the additive mixture are shown in Table 5). The reactor was sealed and purged of oxygen. The reaction mixture was heated to 63° C. and the reaction proceeded adiabatically. Typical reaction peak temperature was 165° C. When the reaction was complete, the mixture was cooled to below 75° C. To about 70 grams of the reaction product of the first step was added 0.7 grams of a mixture (the contents of the additive mixture are shown in Table 6) and in Example 5, added 0.35 grams IOTG. The reactor was sealed and purged of oxygen. The reaction mixture was heated to 65° C. and the reaction proceeded adiabatically. Typical reaction peak temperature was 160° C. The samples were removed from the reactor, Inherent Viscosity (IV) was measured using the Test Method given above, with the exception that Examples 6 and 7 were in a 70:30 THF/toluene solution at a concentration of about 0.7 g/dL and Example 5 was in EA at a concentration of 0.3 g/dL, and provided the results shown in Table 7.

Samples of the polymer from Examples 5 and 7 were dissolved in EA to 5% solids solutions, coated onto PET using a Number 6 Mayer rod and dried in a 65° C. oven for 30 minutes to yield a release surface. The release surface was tested by adhering samples of SCOTCH MAGIC tape 810 (commercially available from 3M Company, St. Paul, Minn.) to the release surface, aging for the specified time period and conditions, and conducting the Release Test described in the Test Method above. The Results are shown in Tables 8 and 9.

Examples 8 and 9

For Examples 8-9 essentially adiabatic polymerizations were carried out by a one step reaction within a VSP2 adiabatic reaction apparatus equipped with a 316 stainless steel test can (available from Fauske and Associates Inc, Burr Ridge Ill.). In the VSP2 reaction vessel was placed ODA, AN, MA, AA and MFS in the amounts shown in Table 4. To the mixture were added 0.1 grams of Antioxidant-1 and 1.03 grams of a mixture (the contents of the additive mixture are shown in Table 5). The reactor was sealed and purged of oxygen. The reaction mixture was heated to 63° C. and the reaction proceeded adiabatically. Typical reaction peak temperature was 165° C. The samples were removed from the reactor, Inherent Viscosity (IV) was measured using the Test Method given above, with the exception that Examples 8 and 9 were in a 70:30 THF/toluene solution at a concentration of about 0.5 g/dL and provided the results shown in Table 7.

TABLE 4

| Example | ODA (parts) | AN (parts) | MA (parts) | AA (parts) | SiMac (parts) | MFS (parts) | IOTG (parts) |
|---|---|---|---|---|---|---|---|
| 5 | 30 | 25 | 10 | 5 | 30 | 0 | 3 |
| 6 | 30 | 25 | 10 | 5 | 30 | 0 | 1 |
| 7 | 30 | 25 | 10 | 5 | 0 | 30 | 0 |
| 8 | 30 | 22 | 5 | 3 | 0 | 40 | 0 |
| 9 | 27 | 15 | 5 | 3 | 0 | 50 | 0 |

TABLE 5

| Example Additive Mixture | Initiator-1 (parts) | Initiator-2 (parts) | Initiator-6 (parts) | Initiator-4 (parts) | MA (parts) |
|---|---|---|---|---|---|
| 5 | 0.1 | 0.1 | 0.05 | 0 | 10 |
| 6 | 0.1 | 0.1 | 0 | 0 | 10 |
| 7 | 0.1 | 0.1 | 0.05 | 0 | 10 |
| 8 | 0.1 | 0.1 | 0.05 | 0.05 | 10 |
| 9 | 0.1 | 0.1 | 0.05 | 0.05 | 10 |

TABLE 6

| Example Additive Mixture | IOTG (parts) | Initiator-1 (parts) | Initiator-2 (parts) | Initiator-4 (parts) | Initiator-6 (parts) | EA (parts) |
|---|---|---|---|---|---|---|
| 5 | 0 | 0.5 | 0.5 | 0.1 | 0.5 | 48.4 |
| 6 | 3.5 | 0.5 | 0.5 | 0.1 | 0.5 | 44.9 |
| 7 | 0 | 0.5 | 0.5 | 0.1 | 0.5 | 48.4 |

TABLE 7

| Example | IV (dl/g) | Wt % Solids (based on total wt of mixture) |
|---|---|---|
| 5 | 0.11 | 93.5 |
| 6 | 0.14 | 95.2 |
| 7 | 0.09 | 85.2 |
| 8 | 0.13 | 90.0 |
| 9 | 0.19 | 98.3 |

Comparative Example C2

A double layer of SCOTCH MAGIC tape 810 (commercially available from 3M Company, St. Paul, Minn.) was peeled from a roll and aged for the specified time period and conditions. The top layer of the double layer was tested for peel and readhesion as described in the Test Method above. The Results are in Tables 8 and 9.

TABLE 8

| Example | 180° Peel after 3 days at RT (N/dm) | Readhesion after 3 days at RT (N/dm) | 180° Peel after 3 days at 65° C. (N/dm) | Readhesion after 3 days at 65° C. (N/dm) |
|---|---|---|---|---|
| 7 | 2.26 | 25.6 | 4.88 | 18.6 |
| C2 | 7.47 | 10.1 | 19.91 | 9.19 |

TABLE 9

| Example | 180° Peel after 2 days at RT (N/dm) | Readhesion after 2 days at RT (N/dm) | 180° Peel after 2 days at 65° C. (N/dm) | Readhesion after 2 days at 65° C. (N/dm) |
|---|---|---|---|---|
| 5 | 1.89 | 10.8 | 1.98 | 0.77 |
| C2 | 5.76 | 8.8 | 23.64 | 10.8 |

Example 10

Extruded release film was prepared using a dry blended mixture of 95 parts by weight LDPE and 5 parts by weight the polymer produced in Example 7. The mixture was fed into a 1.9 centimeter (0.75 inch) Brabender extruder with a mixing screw. After melting and mixing, the extrudate was forced through a 15.2 centimeter (6 inch) flat cast extrusion die to form a molten film. Extrusion temperatures of 110, 115, 120, 140, and 140° C. were used, extrusion pressure was 2,960 to 3,450 kiloPascals (430 to 500 pounds) at a rate of 90 RPM. The molten film was passed through a chilled roll stack to cool and solidify the resins into final finished film form. The resultant film was transparent. To generate samples for release testing, the adhesive side of 3M SCOTCHCAL ELECTROCUT Graphic Film 7725-10 (commercially available from 3M Company, St. Paul, Minn.) was laminated to the molten polymer before entering the chilled nip. Upon cooling and aging approximately one week, 2.54 centimeter (1 inch) wide strips were cut from the roll and tested for release value using the Test Method described above (readhesion testing was not carried out), giving a release value of 2.62 N/dm.

Comparative Example C3

Extruded release film was prepared as described in Example 7 using only LDPE. Extrusion temperatures of 185, 190, 195, 200, and 200° C. were used. To generate samples for release testing, the adhesive side of 3M SCOTCHCAL ELECTROCUT Graphic Film 7725-10 (commercially available from 3M Company, St. Paul, Minn.) was laminated to the molten polymer before entering the chilled nip. Upon cooling and aging approximately one week, 2.54 centimeter (1 inch) wide strips were cut from the roll and tested for release value using the Test Method described above (readhesion testing was not carried out), giving a release value of 4.47 N/dm.

Example 11

For Example 11, essentially adiabatic polymerization was carried out by a two step reaction within a VSP2 adiabatic reaction apparatus equipped with a 316 stainless steel test can (available from Fauske and Associates Inc, Burr Ridge Ill.). In the VSP2 reaction vessel was placed MA (49 grams), MMA (20 grams), MAA (5 grams), IOTG (0.3 grams) and MFS (25 grams). To the mixture was added 0.1 grams of Antioxidant-1 and 1.02 grams of a mixture containing: Initiator-1 (0.1 gram) and Initiator-3 (0.1 gram) dissolved in 10 grams of MA. The reactor was sealed and purged of oxygen. The reaction mixture was heated to 59° C. and the reaction proceeded adiabatically. Typical reaction peak temperature was 170° C. When the reaction was complete, the mixture was cooled to below 65° C. To about 70 grams of the reaction product of the first step was added 0.7 grams of a mixture containing: Initiator-1 (0.2 gram), Initiator-2 (0.2 gram), Initiator-4 (0.04 gram) and Initiator-6 (0.2 gram) dissolved in 19.36 grams of EA. The reactor was sealed and purged of oxygen. The reaction mixture was heated to 59° C. and the reaction proceeded adiabatically. Typical reaction peak temperature was 190° C. The samples were removed from the reactor, Inherent Viscosity (IV) was measured using the Test Method given above and was found to be 0.25 dl/gm.

Example 12

The polymer produced in Example 11 was cooled with liquid nitrogen and fed through an IKA Werke MF-10 grinder at 3000 rpm with a 2.0 mm sieve at the outlet of the grinder to provide a granular material. This material (10 parts by weight) was dry blended with LDPE (90 parts by weight) and fed into a 1.0 inch twin screw conical extruder with a mixing screw. The extrudate was passed through a strand die into a 0° C. water bath and the resulting strand was cut into 0.125 inch round pellets. The pellets were dried in a 65.5° C. oven for 24 hours.

The blended pellets from above (50 parts) were further dry blended with LDPE (45 parts), Additive-1 (1 part) and Additive-2 (4 parts). The mixture was fed into a 1.9 centimeter (0.75 inch) Brabender extruder with a mixing screw (top layer). Another 1.9 centimeter (0.75 inch) Brabender extruder with a mixing screw (bottom layer) was fed with a dry blended mixture of LDPE (96 parts) and Additive-2 (4 parts). The extrudate from the two extruders was forced through a 15.2 centimeter (6 inch) flat cast 2-layer extrusion die to form a molten film with approximately 1:2 ratio of top layer:bottom layer. Extrusion temperatures of 160, 170, and 190° C. were used. The molten film was passed through a chilled roll stack to cool and solidify the resins into final finished film form. The resultant film was semi-transparent with a silver tone. Samples of the film were laminated with Packaging Tape. The samples were placed in a 65° C. oven for 10 days, then cooled to 20° C. prior to testing. The samples were tested for peel and readhesion as described in the Release Test Method above. The data are presented in Table 10.

Example 13

The blended pellets from Example 12 (70 parts) were further dry blended with LDPE (25 parts), Additive-1 (1 part) and Additive-2 (4 parts). The mixture was fed into a 1.9 centimeter (0.75 inch) Brabender extruder with a mixing screw (top layer). Another 1.9 centimeter (0.75 inch) Brabender extruder with a mixing screw (bottom layer) was fed with LDPE. The extrudate from the two extruders was forced through a 15.2 centimeter (6 inch) flat cast 2-layer extrusion die to form a molten film with approximately 1:2 ratio of top layer:bottom layer. The molten film was passed through a chilled roll stack to cool and solidify the resins into final finished film form. The resultant film was semi-transparent with a silver tone. Samples of the film were laminated with Packaging Tape. The samples were placed in a 65° C. oven for 10 days, then cooled to 20° C. prior to testing. The samples were tested for peel and readhesion as described in the Release Test Method above. The data are presented in Table 10.

Comparative Example C4

The reverse side of the film from Example 12 was laminated with Packaging Tape. The samples were placed in a 65° C. oven for 10 days, then cooled to 20° C. prior to testing. The samples were tested for peel and readhesion as described in the Release Test Method above. The data are presented in Table 10.

TABLE 10

| Example | 180° Peel after 10 days at 65° C. (N/dm) | Readhesion after 10 days at 65° C. (N/dm) |
|---|---|---|
| 12 | 32.2 | 22.5 |
| 13 | 34.0 | 16.4 |
| C4 | 44.9 | 15.8 |

What is claimed is:
1. A method consisting essentially of:
providing a first reaction mixture comprising:
an ethylenically unsaturated silicone-containing monomer;
at least one additional ethylenically unsaturated monomer;
a chain transfer agent; and
a thermal initiator;
deoxygenating the first reaction mixture;
heating the first reaction mixture to a temperature above the activation temperature of the thermal initiator;
allowing the first reaction mixture to polymerize under essentially adiabatic conditions to yield an at least partially polymerized mixture;
cooling the at least partially polymerized mixture;
adding an additional thermal initiator, and a chain transfer agent to the partially polymerized mixture to form a second reaction mixture;
deoxygenating the second reaction mixture;
heating the second reaction mixture to a temperature above the activation temperature of the additional thermal initiator;
allowing the second reaction mixture to polymerize under essentially adiabatic conditions to form a polymer;
isolating the polymer; and
coating the polymer on a substrate.
2. The method of claim 1, wherein the ethylenically unsaturated silicone-containing monomer comprises a silicone macromer with the structure:

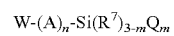

$$W\text{-}(A)_n\text{-}Si(R^7)_{3-m}Q_m$$

wherein W is a vinyl group;
A is a divalent linking group;
n is zero or 1;
m is an integer of from 1 to 3; $R^7$ is hydrogen, alkyl, aryl, or alkoxy; and
Q is a monovalent siloxane polymeric moiety having a number average molecular weight above about 500 and is essentially unreactive under copolymerization conditions.

3. The method of claim 2, wherein the ethylenically unsaturated silicone-containing monomer comprises a silicone (meth)acrylate macromer.

4. The method of claim 2, wherein the at least one additional ethylenically unsaturated monomer comprises at least one alkyl (meth)acrylate monomer.

5. The method of claim 4, wherein the at least one ethylenically unsaturated monomer further comprises at least one polar ethylenically unsaturated monomer.

6. The method of claim 2, wherein the at least one additional ethylenically unsaturated monomer comprises an alkyl (meth)acrylate which as a homopolymer has a Tg above about 30° C.

7. The method of claim 1, wherein the coating step comprises hot melt coating, solvent coating or coextrusion.

8. The method of claim 1, wherein the polymer comprises a pressure sensitive adhesive and the substrate comprises a film, a tape backing, or a release liner.

9. The method of claim 8, further comprising the step of photochemically curing the coated pressure sensitive adhesive polymer.

10. The method of claim 1, wherein the polymer is a release material and the substrate comprises a film or a tape backing.

11. The method of claim 10, further consisting essentially of the step of blending the release material with a thermoplastic polymer prior to coating.

* * * * *